(12) United States Patent
Cox et al.

(10) Patent No.: US 11,675,532 B2
(45) Date of Patent: Jun. 13, 2023

(54) MEMORY COMMAND THAT SPECIFIES ONE OF MULTIPLE POSSIBLE WRITE DATA VALUES WHERE THE WRITE DATA IS NOT TRANSPORTED OVER A MEMORY DATA BUS

(71) Applicant: Sony Group Corporation, Tokyo (JP)

(72) Inventors: Christopher E. Cox, Placerville, CA (US); Christopher P. Mozak, Portland, OR (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/563,589

(22) Filed: Dec. 28, 2021

(65) Prior Publication Data

US 2022/0121392 A1  Apr. 21, 2022

Related U.S. Application Data

(63) Continuation of application No. 16/264,591, filed on Jan. 31, 2019, now Pat. No. 11,226,762.

(51) Int. Cl.
*G06F 12/14* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC .. G06F 13/4243; G06F 3/0604; G06F 3/0655; G06F 3/0673
See application file for complete search history.

(56) References Cited

U.S. PATENT DOCUMENTS

| | | |
|---|---|---|
| 2009/0109771 A1 | 4/2009 | Cox et al. |
| 2017/0255387 A1 | 9/2017 | Cox et al. |
| 2017/0255412 A1 | 9/2017 | Cox et al. |
| 2018/0033489 A1 | 2/2018 | Son et al. |
| 2019/0096468 A1 | 3/2019 | McCall et al. |
| 2020/0026667 A1 | 1/2020 | Chun et al. |

*Primary Examiner* — Yong J Choe
(74) *Attorney, Agent, or Firm* — Michael Best & Friedrich LLP

(57) ABSTRACT

An apparatus is described. The apparatus includes a memory controller having an interface to communicate with a memory. The memory controller comprising logic circuitry to specify one of multiple possible write values to the memory during a write operation with multiple bits of a command that is sent on a command address bus that emanates from the interface. The memory to write any one of the possible write values into its storage cells while the memory interface is in a power saving state wherein the specified one write value is not articulated by the memory controller on a data bus of the interface as part of the write operation.

20 Claims, 10 Drawing Sheets

| Command | CS | CA[0] | CA[1] | CA[2] | CA[3] | CA[4] | CA[5] | CA[6] | CLK |
|---------|----|----|----|----|----|----|----|----|----|
| CAS | H | L | L | H | H | V | V | V | ↑ |
|  | X | DC0=0 | DC0=0 | DC0=0 | DC0=0 | WRX | F1 = H or L | F2 = H or L | → |

| Command | CS | CA[0] | CA[1] | CA[2] | CA[3] | CA[4] | CA[5] | CA[6] | CLK |
|---|---|---|---|---|---|---|---|---|---|
| CAS | H | L | L | H | H | V | V | V | ↑ |
|  | X | DC0= pgb0 | DC0= pgb1 | DC0= pgb2 | DC0= pgb3 | WRX | V | F = H or L | → |

MEMORY COMMAND THAT SPECIFIES ONE OF MULTIPLE POSSIBLE WRITE DATA VALUES WHERE THE WRITE DATA IS NOT TRANSPORTED OVER A MEMORY DATA BUS

CROSS REFERENCE TO RELATED APPLICATIONS

This Application is a continuation of U.S. application Ser. No. 16/264,591, filed on Jan. 31, 2019, the entire contents of which are incorporated herein by reference.

FIELD OF INVENTION

The field of invention pertains generally to the computing sciences and, more specifically, to a memory command that specifies one of multiple possible write data values where the write data is not transported over a memory data bus.

BACKGROUND

Memory designers are increasingly interested in implementing versatile functionality while, at the same time, keeping the register space footprint of the memory devices they build in-check. The ability to internally write any value from a memory's register space provides for a highly versatile power saving memory write process but nevertheless consumes register space to store the value to be internally written.

FIGURES

A better understanding of the present invention can be obtained from the following detailed description in conjunction with the following drawings, in which.

DETAILED DESCRIPTION

The Joint Electron Devices Engineering Council (JEDEC) promulgates memory related standards for industry adoption. The standards specify interfaces to memory devices and, where appropriate, expected memory controller behavior. With memory device manufacturers designing their products to conform to the JEDEC specifications, system designers benefit from the inherent multi-sourcing that results. That is, being designed identically (in terms of behavior), one manufacturer's memory chip of a particular JEDEC standard can easily be replaced by another manufacturer's memory chip that conforms to the same standard.

It has been observed that memory devices are frequently written to with the same data value. As such, one JEDEC industry standard, referred to as dual data rate 5 ("DDR5"), has incorporated a "Write-Pattern" command which is commonly referred to as a WRITE X command. According to the WRITE X command, a data value that is expected to be repeatedly written into a memory device is programmed into register space of the memory device. When the host (memory controller) desires to write the data value into the memory device, the host sends a WRITE X command to the memory device instead of actually transferring the entire value from host to memory device.

In response to the WRITE X command, the memory device internally reads the register space that the data value has been stored in and writes the data value into its memory cells. Generally, memory chips are manufactured in four different data bus widths: 1) "X4" in which the memory chip has a four bit wide data bus; 2) "X8" in which the memory chip has an eight bit wide data bus; and, 3) "X16" in which the memory chip has a 16 bit wide data bus.

The JEDEC DDR5 specification specifies that a byte of MR register space (referred to as the "Write Pattern" mode register) is to be reserved within a memory chip to store a data value for use with the WRITE X command. In the case of an X4 memory device, only the first four bits of the Write Pattern mode register are used to provide the data value (OP[3:0], where "OP" corresponds to the Write Pattern mode register's physical register space in the memory device); in the case of an X8 memory device, the entire eight bits of the Write Pattern mode register are used to provide the data value (OP[7:0]); and, in the case of an X16 memory device, the eight bits of the Write Pattern mode register are repeated twice over the memory device's internal 16 bit wide data bus to create the data value (i.e., OP[7:0]; OP[7:0]).

Figure 1A:
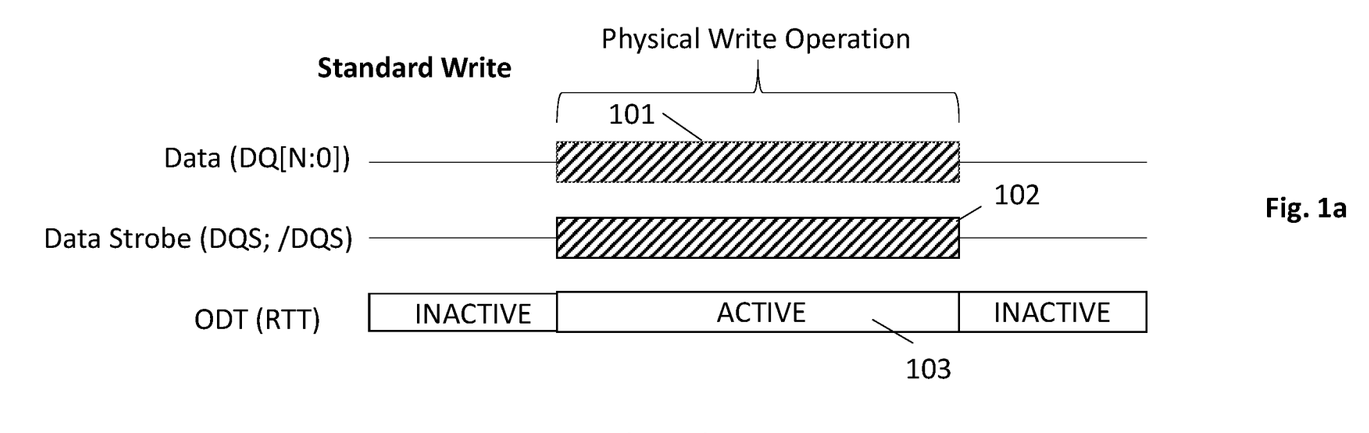
FIGS. 1a and 1b show a standard write process and a WRITE_X write process.

The WRITE X command helps the system conserve power when the data value would otherwise be written from the host to the memory device. Here, FIG. 1a shows a simplistic depiction of standard write 100 of data from the host to the memory device. As observed in FIG. 1a, the standard write 100 requires: 1) actual data transfer 101 from host to memory (over the data or "DQ" bus); 2) strobe or "DQS" signals 102 sent from the host to memory to latch addresses and/or data into the memory; and, 3) activation of memory-side on-die-termination circuits 103 on each of the DQS and DQ wires.

Each of these consume considerable power. In the case of 1) and 2) above, generally, any high frequency dynamic/changing voltage levels cause considerable power consumption. With respect to 3) above, on-die-termination circuits are used to prevent disruptive reflections on the DQ and DQS wires by terminating each of the wires with a resistance network on the memory. Although a resistance network greatly diminishes reflected signal energy on its particular wire, it also consumes significant power when activated. As such, the on-die-termination circuits are generally placed in an inactive state except when live signals are actually placed on their respective wires.

Figure 1B:
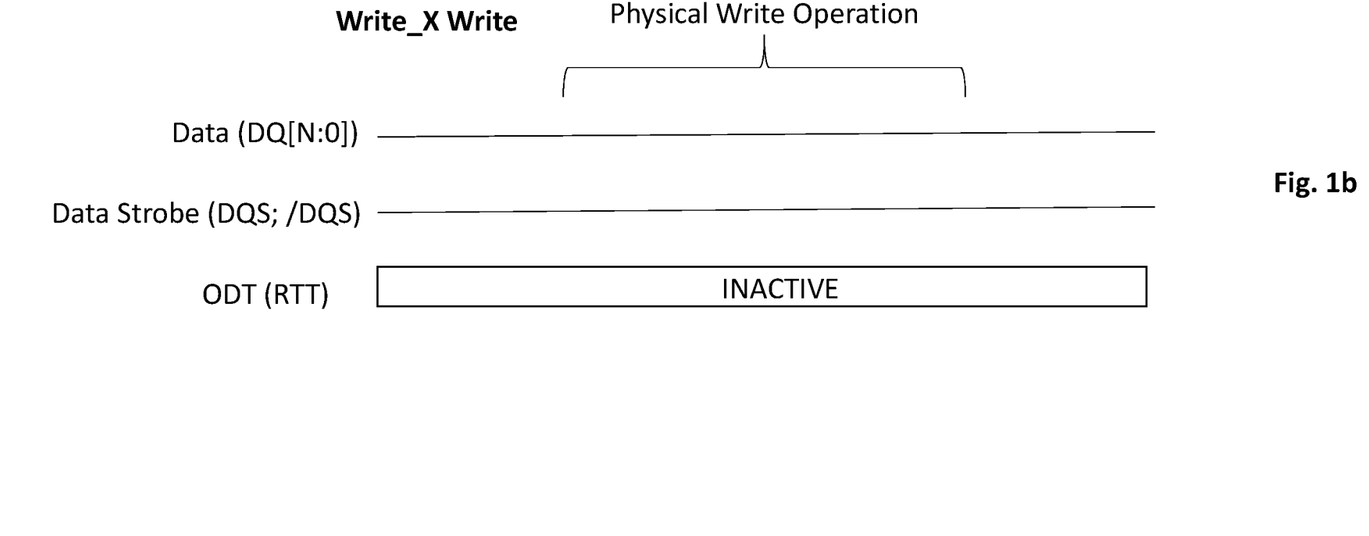

FIG. 1b, by contrast, shows a simplistic depiction of a WRITE_X command. As explained above, in response to receiving the WRITE_X command, the memory refers to its internal Write Pattern mode register as the source of the data to be written into its storage cells. As a consequence, no signals are needed on the DQ and DQS wires, and, the on-die-termination circuits need not be activated. As such, considerable power is saved by using the WRITE_X command. The more frequently the system desires to write the value that is stored in the Write Pattern mode register of the memory, the more power is saved.

In addition to power savings, the Write X command frees up bus bandwidth that could be used by other ranks. Since the DQ and DQS busses are not being used to transfer data for the Write_X command, they are free to be used for other activities as shown in FIG. 1b. More specifically, although the target DRAM rank is busy performing the Write_X command, other DRAM ranks in the system are free to use the DQ/DQS bus to execute Read, Write or WriteX commands in parallel. For example, in a 4 rank system, 3 ranks could all be doing writeX while the 4.sup.th rank executes a regular write such that total bus bandwidth is increased by as much as 4.times.

Unfortunately, early revisions of the JEDEC low power version of DDR5 ("LPDDR5") do not provide a Write Pattern mode register to support a full WRITE_X command as it exists in the DDR5 standard. As such, users cannot program any desired data value into an LPDDR5 memory. Instead, the current LPDDR5 specification requires the memory device to have an internally hardwired value of all 0s. In essence, LPDDR5 has essentially adopted a WRITE_ZERO command instead of WRITE_X command.

Thus, as currently specified, an LPDDR5 host can issue a WRITE_X command but the command only causes the memory to internally write all 0s as the data value. Power savings are still realized a described above with respect to FIG. 1b (the DQ DQS and on-die-termination signaling of the WRITE_ZERO command is essentially the same as that discussed above with respect to FIG. 1b and the DDR5 WRITE_X operation). However, such power savings can only be realized when the system is writing all 0s and not any other data value (in some systems, it has been shown that 40% of all memory bytes transmitted are all zero).

Thus, earlier revisions of the LPDDR5 specification do not accommodate systems that will write another value to memory more frequently than it will write all 0s to memory.

The instant application therefore describes ways in which more versatile WRITE_X or WRITE_X-like commands that implement some/all of the power saving techniques of FIG. 1b when writing any of multiple possible values into a memory device that does not have the reserved register space (as in DDR5) to internally provide any value for writing into the memory device's storage cells.

Figures 2A, 2B:
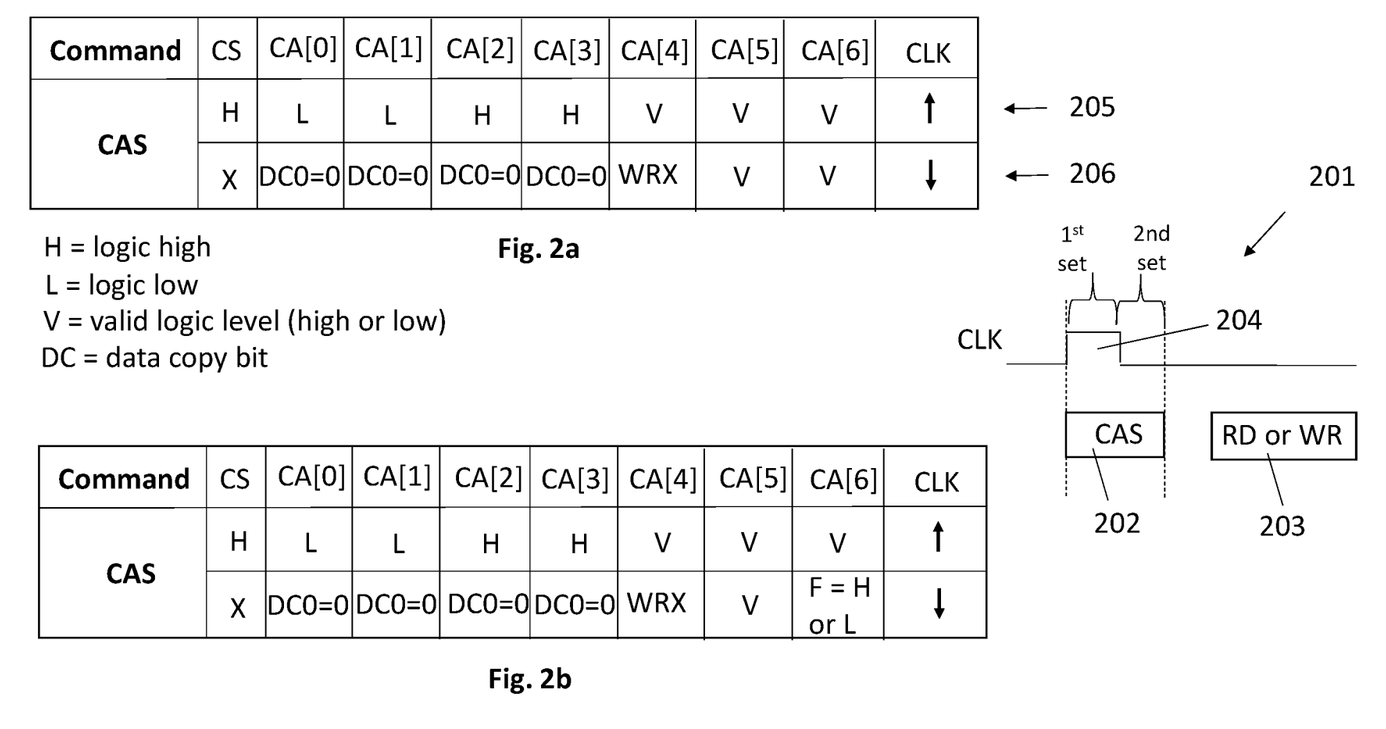
FIG. 2a shows a current LPDDR5 CAS command format.
FIG. 2b shows an improved LPDDR5 CAS command format.

FIGS. 2a and 2b pertain to a technique for enhancing the current LPDDR5 standard so that more than one value (currently, all 0s as discussed above) can be internally written by a memory device using the power saving features of FIG. 1b.

FIG. 2a shows the current bit assignments on the command/address bus ("CA" bus) for the LPDDR5 specification's "CAS" command. Generally, JEDEC specifications contemplate a "command/address" bus (composed of seven CA bits CA[6:0] in LPDDR5) over which a host transfers commands and addresses to a memory device. According to LPDDR5 signaling, as observed in inset 201, a CAS command 202 precedes a READ or WRITE command 203. The CAS command 202 passes two sets of information on opposite sides of a same clock pulse 204. That is, a first information set 205 on wires CA[6:0] of the CA bus are latched by the memory device on the rising edge of the clock pulse 204, then, a second information set 206 on the same CA[6:0] wires are latched on the falling edge of the clock pulse 203 (the host or memory controller determines the timing and values of the CLK and CA[6:0] wires).

Here, when the clock pulse triggers a rising edge, the first four bits of the CA bus (CA[3:0]) carry an HHLL pattern which is the signature of the CAS command. The memory device, e.g., can begin preparing for a following READ or WRITE command once it recognizes the HHLL pattern on bits CA[3:0] of the CA bus upon the rising clock edge pulse. When the same clock pulse triggers a falling edge, the CA bits CA[3:0] switch to an LLLL pattern (bits CA[3] and CA[2] switch from a high value (H or 1) to a low value (0)). Here, for the second set of information 206, CA wires CA[3:0] formally carry variables referred to as "data copy" bits (or, "DC" bits).

The CA[4] bit ("WRX") of the second set of information 206 specifies whether or not the following operation is to be a Write_X. If so, the CA[4] bit will be a logical high (H). In this case the following operation will be a WRITE_X operation and the memory will write all 0s internally into its memory cells (the immediately following command will be a WRITE command but the memory device will already understand from the preceding CAS command that the write operation is a Write_X operation. The power saving signaling of FIG. 1b will also be presented on the memory interface during the internal write of all 0s. By contrast, if the CA[4] bit is a logical low (L), the CAS command is indicating that a Write_X is not to occur. As such, the following command may be, e.g., a nominal READ or WRITE command in reference to a nominal READ or WRITE operation.

Notably, the CA[6] bit of the second set of information 206 has no specified purpose. Referring to FIG. 2b, therefore, an improvement made over earlier LPDDR5 specifications (and implemented in current LPDDR5 specifications) is to use the CA[6] bit of the second set of information to specify whether all 0s or all s are to be internally written by the memory device into its storage cells (a function "F" is defined where F=1 means all is are to be written and F=0 means all 0s are to be written). Here, if the CA[4] bit of the second set of information is set to a 1, a Write_X operation is specified and the memory device will write all is if the CA[6] bit is set to a logical high, or, the memory device will write all 0s if the CA[6] bit is set to a logical low.

Thus, unlike a memory device that only conforms to the CAS command structure of FIG. 2a and is only capable of writing all 0 s, by contrast, a memory device that conforms to the CAS command structure of FIG. 2b is capable of writing all 0s or all is where, whether all 0 s or all 1s is to be written is specified by the host when the host issues a specific CAS command.

Figure 3A:
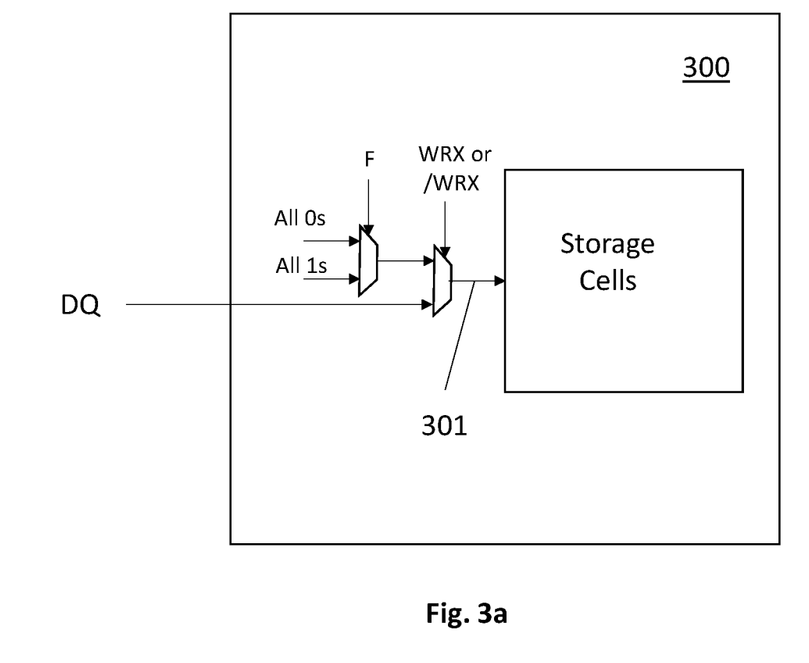
FIG. 3a shows a memory device that can support the LPDDR5 CAS command format of FIG. 2b.

FIG. 3a depicts a high level view of a memory device 300 that supports the CAS structure of FIG. 2b. As observed in FIG. 3a the memory device 300 has multiplexers along its write path 301 so that information from three different sources can written into the memory device's storage cells 302 (data that is received from the external DQ bus, internally generated all 0 s, and, internally generated all is).

With respect to addressing for the Write_X command, note that the CAS command is followed by a WRITE command which includes the column address information for the write operation. Row address information can be specified with ACTIVATE command(s) that precede the CAS command.

A further improvement that exists in the current LPDDR5 specification for x16 devices (i.e., the device has a 16 bit wide data bus) is to use the CA[5] and CA[6] bits of different commands to set first and second bytes, respectively, of the 16 bit write data. Specifically, the CA[6] bit of the second set of information of a CAS command 202 defines the first byte of the 16 bit write word (if CA[6]=1 the first byte of the write data is all 1s, or, if CA[6]=0 the first byte of the write data is all 0 s) and is latched on the falling edge of clock pulse 204. The CA[5] bit of the second set of information of a following WRITE command 203 defines the second byte of the 16 bit write word (if CA[5]=1 the second byte of the write data is all 1s, or, if CA[5]=0 the second byte of the write data is all 0 s) and is latched on the rising edge of the clock pulse that the following WRITE command is triggered upon (not shown in FIG. 2b for illustrative ease).

Figure 2C:
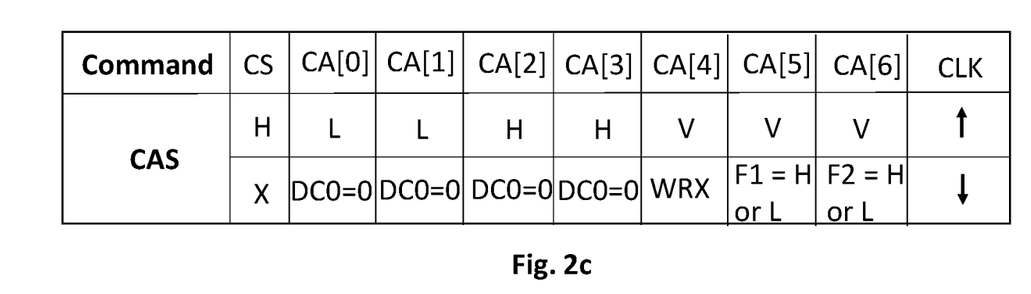
FIG. 2c shows another improved LPDDR5 CAS command.

Referring to FIG. 2c, FIG. 2c shows a new improved approach in which both the CA[5] and CA[6] bits of the second set of a single CAS command are used to specify data to be written where CA[5] carries a first function F1 that defines a first contiguous set of bits to be written into the memory device (if F1=1 the contiguous set of bits are all equal to 1, or, if F=0 the contiguous set of bits are all 0) and CA[6] carries a second function F2 that defines a second contiguous set of bits to be written into the memory device (if F2=1 the contiguous set of bits are all equal to 1, or, if F2=0 the contiguous set of bits are all 0).

Here, in the case of an X16 LPDDR5 memory device for example, F1 defines the lower ordered eight bits of the write word (DQ[7:0]) and F2 defines the higher ordered eight bits of the write word (DQ[15:8]). For smaller memory bus width devices, the write word is scaled down correspondingly. For example, in the case of a X8 device, F1 defines bits DQ[3:0] of the write word and F2 defines bits DQ[7:4] of the write word. Likewise, for an X4 device, F1 defines bits DQ[1:0] of the write word and F2 defines bits DQ[3:2] of the write word.

Figure 3B:
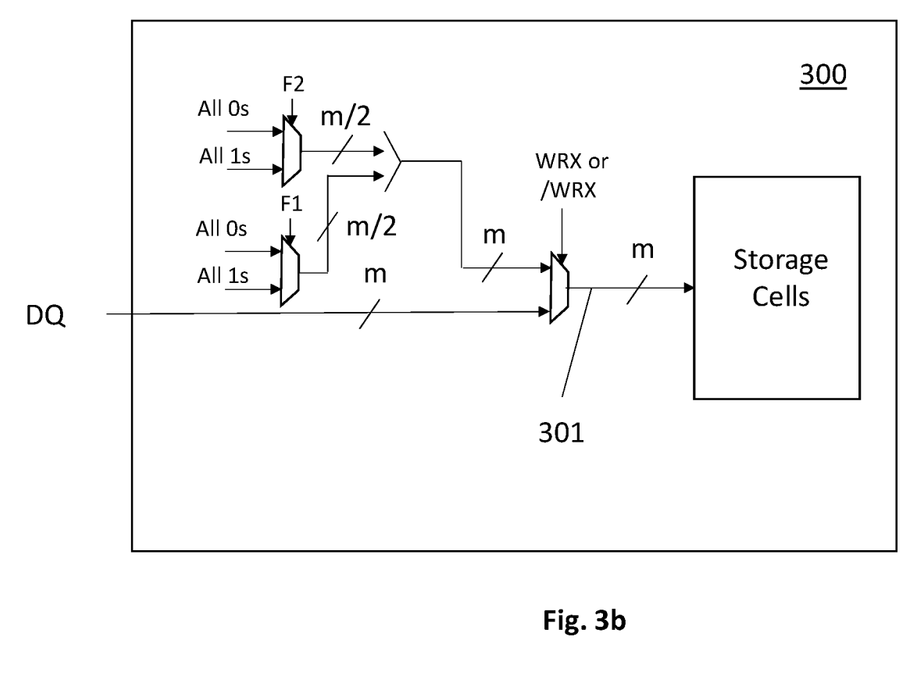
FIG. 3b shows a memory device that can support the LPDDR5 CAS command format of FIG. 2c.

FIG. 3b shows a memory device designed to execute the command of FIG. 2c. Here, the word that is written in the memory device's storage cells is a concatenation from first and second multiplexers that implement the F2 and F1 patterns, respectively.

All of these solutions, nevertheless, limit the host in terms of the available data patterns that can be written using the power savings technique of FIG. 1b.

Figure 4:
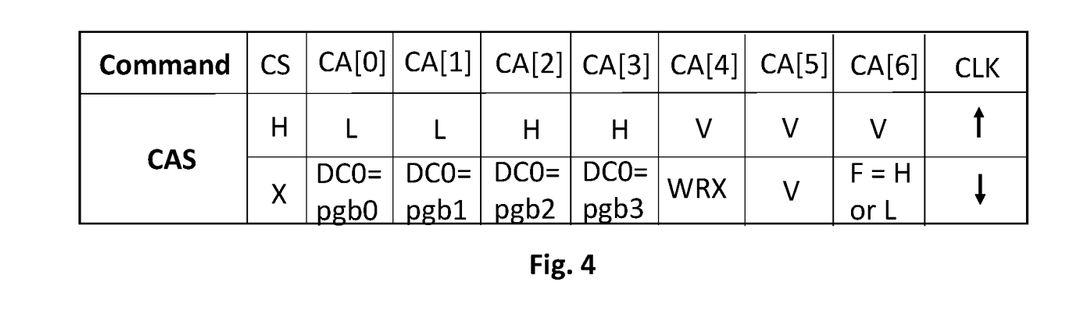
FIG. 4 shows another improved LPDDR5 CAS command format.

FIG. 4 therefore shows a further improved CAS command that allows for a large number of write values beyond just the all 0s or all 1s option of FIG. 2b or other simplistic data pattern options (such as the x16 extension described just above or the CA[5], CA[6] solution of FIG. 2c). Here, as observed in FIG. 4, the CA[3:0] "data copy" bits in the second set of information in the CAS command are re-purposed to carry the desired write value (programmed bits "pgb[3:0]"). Here, for the second set of information, if the Write_X value in CA[4] indicates that the following command will not be a Write_X, the memory device interprets the CA[3:0] as per the standard's applicable interpretation. This may include ignoring bits CA[3:0] or looking for some specific value, whether as an element of another operation that is specified by the CAS command or that is associated with the CAS command more generally.

However, if the Write_X value in CA[4] of the second set of information indicates that the following command will be a Write_X (if CA[4]=Write_X=logic high), the memory device latches bits CA[3:0] from the CA bus and uses them as the source of the write information. Again, the power saving features of FIG. 1b are used during the actually writing of the value that is captured from the CA bus.

In the case of an X4 memory device, according to one embodiment, the four bit wide latched CA[3:0] value is written directly as the complete write word that is written into the memory.

By contrast, in the case of an X8 memory device, the latched bits can be concatenated according to various possible patterns to form the full write word. For example, according to a first approach, the 8 bit write word may be CA[3:0]; CA[3:0], or, according to a second approach, the 8 bit write word may be CA[3]; CA[3]; CA[2]; CA[2]; CA[1]; CA[1]; CA[O]; CA[O], or, some other desired pattern. In an extended embodiment, which of multiple word pattern options to be implemented are specified by other unused bits on the CA bus. For example, the CA[6] bit may be used to specify one pattern when set high, and, specify another pattern when set low.

Similar approaches may be taken for X16 memory devices. For example, the 16 bit write word may be a straight concatenation CA[3:0]; CA[3:0]; CA[3:0]; CA[3:0], or, a mixed/multiplexed concatenation (e.g., bits 15 through 12 of the written word=CA[3]; bits 11 through 8 of the written word=CA[2]; bits 7 through 4 of the written word=CA[1] and bits 3 through 0 of the written word=CA[0]). Different patterns could be specified by using additional unused bits on the CA bus (e.g., CA[6]).

Figure 5A:
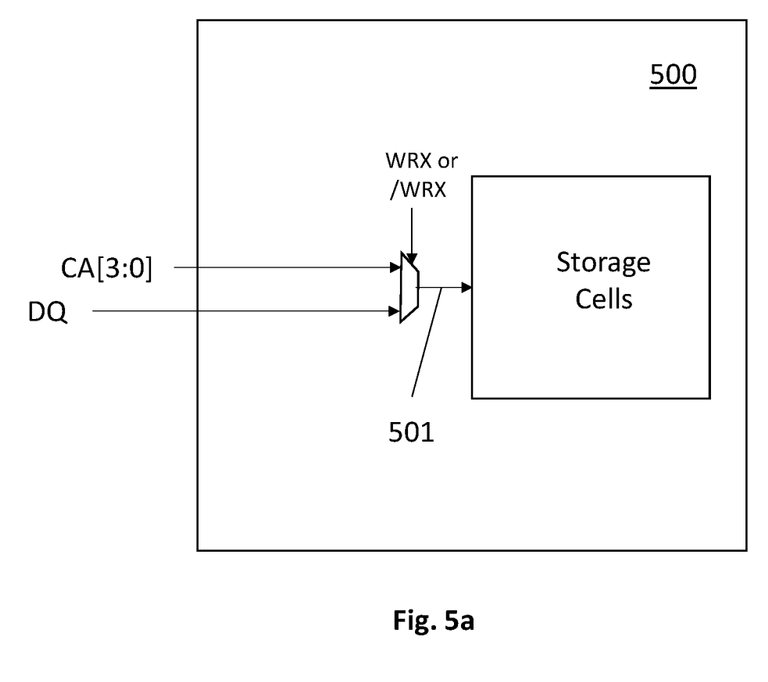
FIG. 5a shows a memory device that can support the LPDDR5 CAS command format of FIG. 4.

FIG. 5a shows a memory device 500 that supports the CAS command of FIG. 4. As observed in FIG. 5, the write path 501 of the memory device includes a multiplexer that multiplexes in data from different sources to form the write word that is to be written into the memory device's memory cells. Specifically, the multiplexer can mux in data from the data bus (DQ) as per a normal write, or, multiplex in information from the CA bus (e.g., bits CA[3:0] as discussed above) to support an expanded CAS function that embeds write data within a CAS command.

Still other memory devices may be designed that include an internally hardwired data option (e.g., all 0s or all 1s) and a host programmed data option that is embedded on CA bits of a CAS command. In this case, the memory device would include a multiplexer having three different kinds of sources: 1) the external data bus (DQ) for normal write operations; 2) the internal hardwired data value for WRITE_X commands that specify an internally hardwired data option; and, 3) the CA bus for WRITE X commands that embed a write value within a CAS command. Here, for example, within a CAS command that specifies a WRITE_X operation is to follow, an unused CA bit (such as the CA[6] bit) could specify whether the hardwired value or an embedded value is to be used as the source of the data word.

Figure 5B:
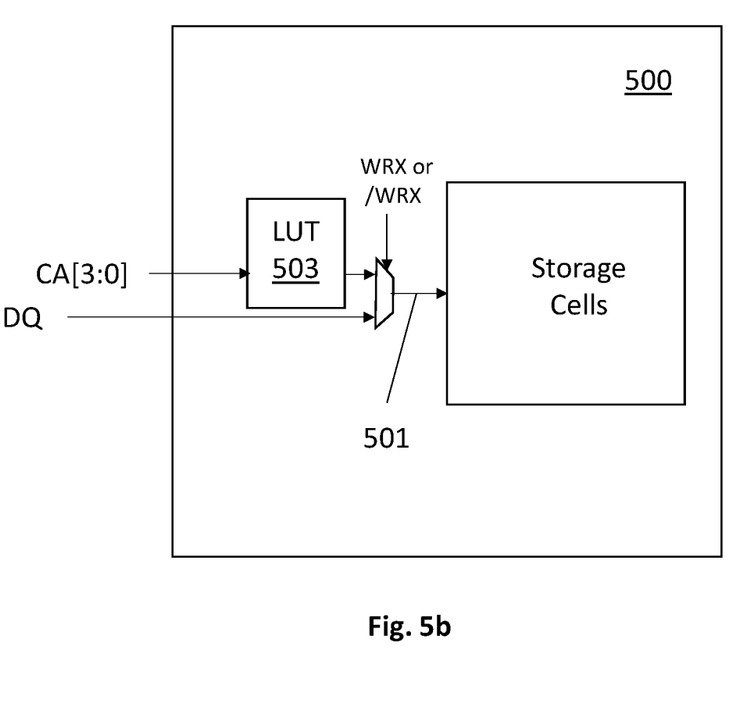
FIG. 5b shows a memory devices that uses the CA[3:0] bits of the command format of FIG. 4 as an address for an on board LUT.

FIG. 5b shows yet another approach in which the CA[3:0] bits are used to specify an input address to an on board look-up table 503 within the memory device 300. Here, the specific value of the CA[3:0] bits cause the content of one of sixteen entries in the LUT 503 to be used as the write data. The approach of FIG. 5b provides even further write data options particularly for x8 or x16 devices. That is, in various x8 embodiments, each entry in the LUT 503 contains a byte of information that is used as the write data when pointed to by the CA[3:0]address. Therefore all $2^8=256$ possible input words can potentially be written into the memory device's storage cells from the memory devices own hardware (the LUT 503), although only 16 of the possible 256 input words can exist in the LUT 503 at any time.

For X16 devices each LUT entry can be 16 bits so that sixteen input words from the set of all possible 16 bit input words can be resident in the LUT 503. In other embodiments, the LUT 503 has eight bit entries in an X16 device and the eight bit word is repeated twice to form the full input word.

The content of the LUT 503 can be programmed, e.g., at system boot-up by firmware and remain constant over system runtime, or, be dynamically changed. In the case of the later, note that the dynamic changing of the LUT can be based on the state of a particular application, process or thread (e.g., when the application/process/thread enters a first region of its code a first set of LUT entry values are programmed into the LUT 503, then, when the application/process/thread enters a second region of its code a second set of LUT entry values is programmed into the LUT 503). Alternatively or in combination, the content of the LUT can be changed when applications/processes/threads change.

For example, when a first application/process/thread is assigned to a region of the system memory that device 300 is a component of, a first set of values are programmed into the LUT 503, then, when a system memory assignment change causes another application/process/thread to operate out of device 300 a second set of values are programmed into the LUT.

Here, the dynamic changing of LUT content based on region of operation of program code and/or identity of program code, can be used to take advantage of known and/or observed write patterns of the different code regions or instances of code such that more commonly written data patterns are entered into the LUT as a function of which program code is executing out of the LUT 503 (and/or the LUT content is otherwise configured to create them). As such, a greater percentage of write operations can be serviced from the LUT 503 irrespective of which program code or program code regions is executing out of the memory device 300 because the LUT's content is "tuned" to the particular program code and/or program code region that is executing out of the memory device 300.

Here, the memory device's supported command structure would be adopted to include a special command for writing an entry into the LUT. In various embodiments the data for an entry would be presented on the data bus (DQ bus) and routed to data inputs of the LUT (entry outputs flow into the device's storage cells).

Although embodiments above been directed to specific bits in the LPDDR5 CAS command, conceivably, other bits in the LPDDR5 CAS command than those specifically described above could be used to specify whether a WRITE_X command applies, specify whether all is or all 0s are to be written or carry a value to be written provided by the host. In this view, it is important to point that the teachings above can also conceivably be applied to standards other than JEDEC LPDDR5, such as any standard having a CAS command that precedes a WRITE command. Even more generally, the teachings above can conceivably be applied to any command that precedes a WRITE command and therefore need not be limited to JEDEC DDR standardized technologies and can even be applied to non standardized technologies.

Figure 6:
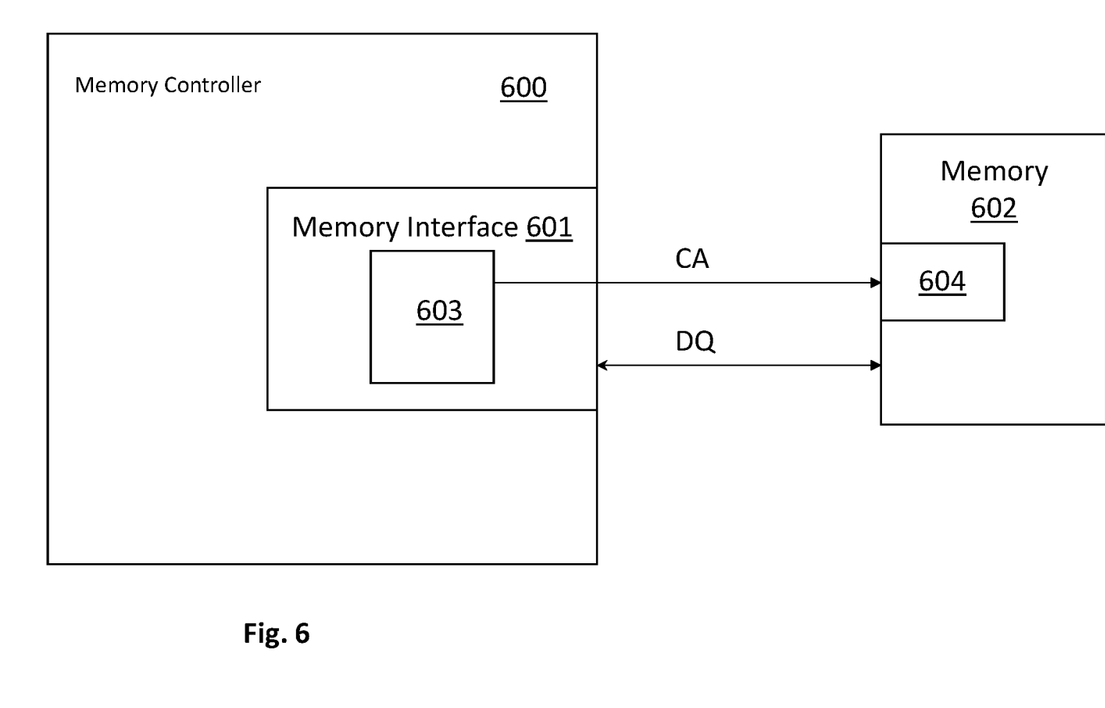
FIG. 6 shows a memory controller that can transmit command consistent the command structures of FIG. 2b and/or FIG. 4.

FIG. 6 shows a memory controller 600 having memory interface logic circuitry 601 to communicate with a memory 602 that does not include register space to supply a write value for writing into the memory's storage cells in order to reduce the power consumption of the memory controller/memory interface technology. As observed in FIG. 6, the memory controller 600 includes special logic circuitry 603 to embed information into a command, such as a command other than a WRITE command (e.g., a command that precedes a WRITE command), that informs the memory 602 of specific information to write while the memory interface is in a power saving state in which the write data and/or associated control information (e.g., clocks, on-die termination signals) are not communicated over the interface. The memory 602 includes corresponding logic circuitry 604 to comprehend and implement the memory controller's command.

Logic circuitry can be any circuitry disposed in a semiconductor chip such as custom hardwired logic circuitry (e.g., application specific integrated circuit (ASIC) logic circuitry), programmable logic circuitry (e.g., a field programmable gate array (FPGA) logic circuitry, programmable logic array (PLA), etc.) or logic circuity that is designed to execute some form of program code such as firmware (e.g., an embedded processor, an embedded controller, etc.).

The memory may be disposed on a dual-in-line memory module (DIMM), or, some other memory module, such as a stacked memory module. The memory may also include register space (e.g., mode register (MR) space) to specifically enable/disable features directed to the memory writing memory values that are either internally provided or embedded in a command sent by the memory controller.

Figure 7:
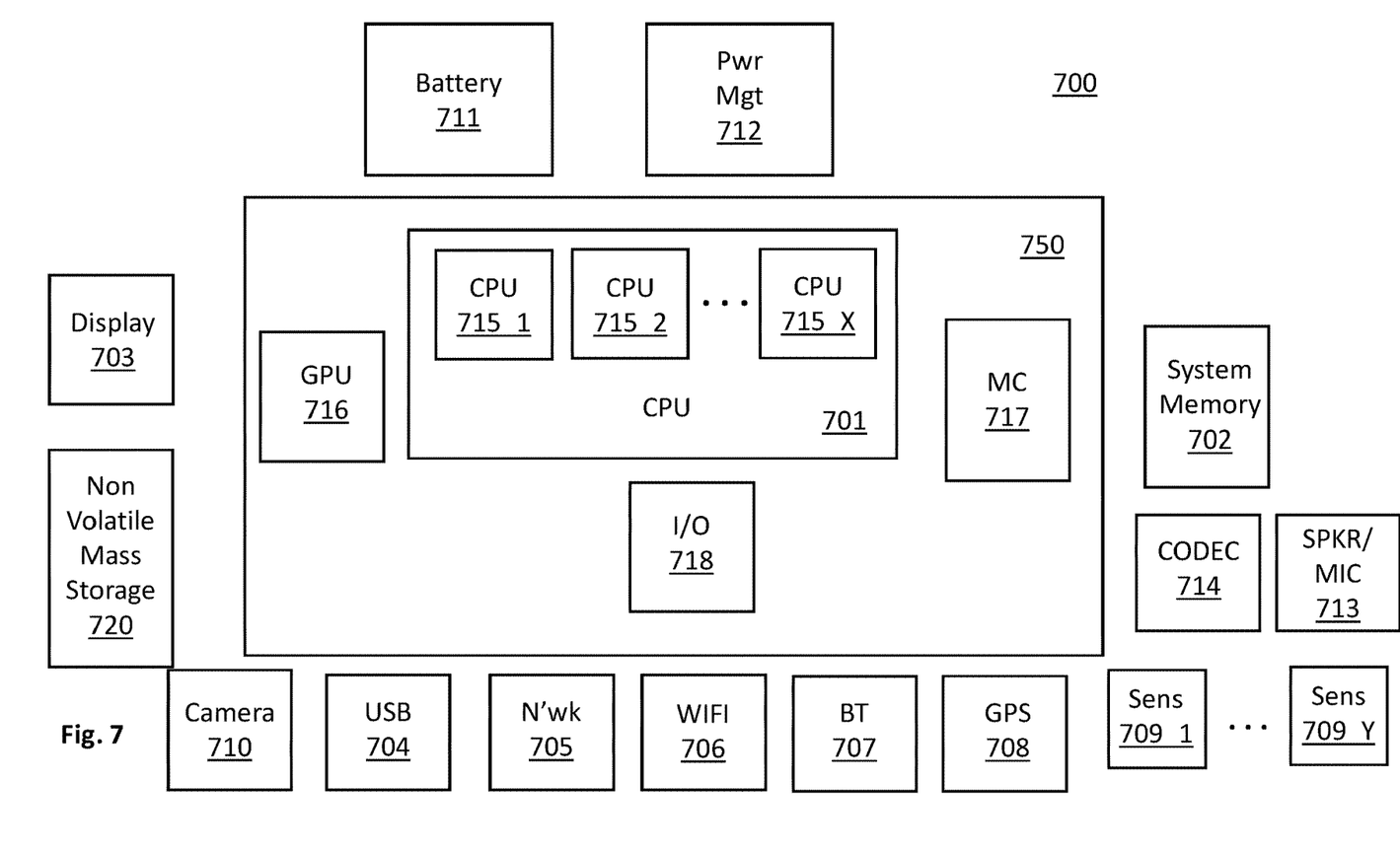
FIG. 7 shows a computing system.

FIG. 7 provides an exemplary depiction of a computing system 700 (e.g., a smartphone, a tablet computer, a laptop computer, a desktop computer, a server computer, etc.). As observed in FIG. 7, the basic computing system 700 may include a central processing unit 701 (which may include, e.g., a plurality of general purpose processing cores 715_1 through 715_X) and a main memory controller 717 disposed on a multi-core processor or applications processor, system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing unit 716 typically executes graphics intensive functions to, e.g., generate graphics information that is presented on the display 703. The memory control function 717 interfaces with the system memory 702 to write/read data to/from system memory 702. The power management control unit 712 generally controls the power consumption of the system 700.

The memory control function 717 and memory 702 may include circuitry to specify write data in a command (such as a CAS commands) rather than physically transporting the data over a memory data bus that couples the memory control function and memory 702 as described at length above. Note that the memory 702 may be implemented with memory chips disposed on a dual-in-line module (DIMM), some other memory module (e.g., a stacked memory module) and/or be integrated in a same package as the memory control function and/or CPU cores.

Each of the touchscreen display 703, the communication interfaces 704-507, the GPS interface 708, the sensors 709, the camera(s) 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750. The computing system also includes non-volatile storage 720 which may be the mass storage component of the system.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A device comprising:
a memory; and
a memory controller including
an interface configured to communicate with the memory, the interface including a data bus and a command address bus, and
logic circuitry configured to
specify a zero value to the memory during a first write operation with multiple bits of a first command that is sent on the command address bus that emanates from the interface, the memory to write the zero value into storage cells of the memory while the interface is in a power saving state, and
specify a non-zero value to the memory during a second write operation with multiple bits of a second command that is sent on the command address bus that emanates from the interface, the memory to write the non-zero value into the storage cells of the memory while the interface is in the power saving state,
wherein the zero value and the non-zero value are not articulated by the memory controller on the data bus of the interface as part of the first write operation and second write operation.

2. The device of claim 1, wherein the second command is not a WRITE command.

3. The device of claim 2, wherein the second command is a CAS command and the interface is compatible with a Joint Electron Devices Engineering Council (JEDEC) promulgated industry standard.

4. The device of claim 3, wherein the JEDEC promulgated standard is an LPDDR5 standard.

5. The device of claim 1, wherein the power saving state includes an absence of write data over the interface, an absence of write strobes over the interface, and an inactivated memory side on-die termination circuitry.

6. The device of claim 1, wherein the memory includes look-up table circuitry having entries, the non-zero value provided by a particular one of the entries identified by the multiple bits.

7. The device of claim 1, wherein the second command precedes a WRITE command in a normal write sequence.

8. The device of claim 7, wherein the non-zero value is communicated with less bits than a size of a data word to be written, and wherein the memory includes circuitry configured to create the non-zero value.

9. The device of claim 7, wherein the non-zero value is embedded in the second command.

10. A method comprising:
specifying, with logic circuitry of a memory controller, a zero value to a memory during a first write operation with multiple bits of a first command that is sent on a command address bus that emanates from an interface, the memory to write the zero value into storage cells of the memory while the interface is in a power saving state; and
specifying, with the logic circuitry, a non-zero value to the memory during a second write operation with multiple bits of a second command that is sent on the command address bus that emanates from the interface, the memory to write the non-zero value into the storage cells of the memory while the interface is in the power saving state,
wherein the zero value and the non-zero value are not articulated by the memory controller on a data bus of the interface as part of the first write operation and second write operation.

11. The method of claim 10, wherein the second command is not a WRITE command.

12. The method of claim 11, wherein the second command is a CAS command and the interface is compatible with a Joint Electron Devices Engineering Council (JEDEC) promulgated industry standard.

13. The method of claim 12, wherein the JEDEC promulgated standard is an LPDDR5 standard.

14. The method of claim 10, wherein the power saving state includes an absence of write data over the interface, an absence of write strobes over the interface, and an inactivated memory side on-die termination circuitry.

15. The method of claim 10, further comprising:
specifying, with the logic circuitry, a WRITE command in a normal write sequence,
wherein the second command precedes the WRITE command in the normal write sequence.

16. The method of claim 15, wherein the non-zero value is communicated with less bits than a size of a data word to be written, and wherein the memory includes circuitry configured to create the non-zero value.

17. The method of claim 15, wherein the non-zero value is embedded in the second command.

18. A memory comprising:

a plurality of storage cells;

an interface configured to communicate with a memory controller, the interface including a data bus and a command address bus; and logic circuitry configured to comprehend a zero value to be written to the plurality of storage cells during a first write operation with multiple bits of a first command that is sent on the command address bus that flows into the interface, write the zero value into the plurality of storage cells while the interface is in a power saving state, comprehend a non-zero value to be written to the plurality of storage cells during a second write operation with multiple bits of a second command that is sent on the command address bus that flows into the interface, and write the non-zero value into the plurality of storage cells while the interface is in the power saving state, wherein the zero value and the non-zero value are not articulated by the memory controller on the data bus of the interface as part of the first write operation and the second write operation.

19. The memory of claim 18, further comprising:

circuitry configured to create the non-zero value, wherein the non-zero value is communicated with less bits than a size of a data word to be written.

20. The memory of claim 18, further comprising:

look-up table circuitry having entries, the non-zero value provided by a particular one of the entries identified by the multiple bits of the second command.

* * * * *